Nov. 3, 1953   E. E. HUPP   2,657,701
FLUID CONTROL VALVE
Filed May 21, 1949   2 Sheets-Sheet 1
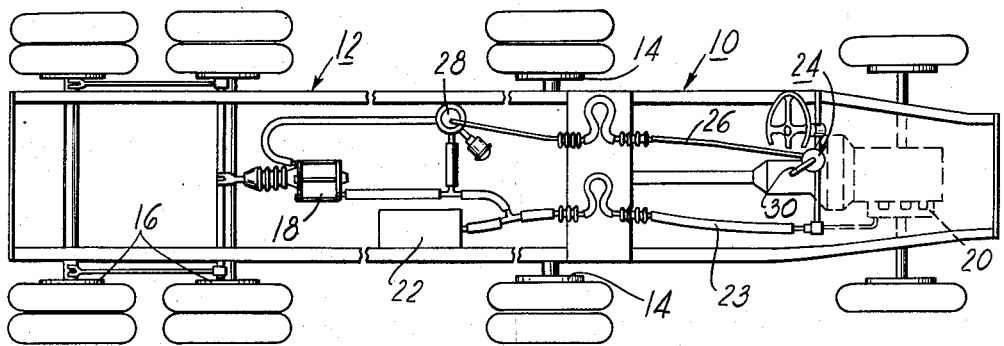
Fig. 1
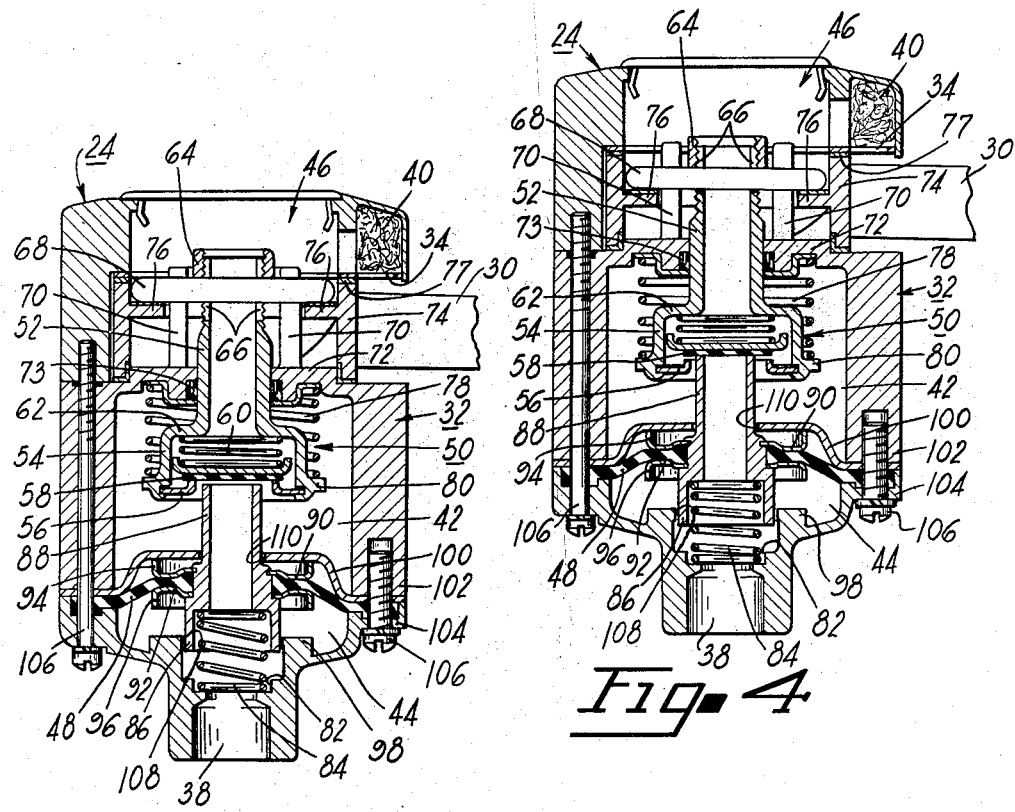
Fig. 2
Fig. 4
INVENTOR.
EDWARD E. HUPP
BY
*G. A. Gust*
ATTORNEY

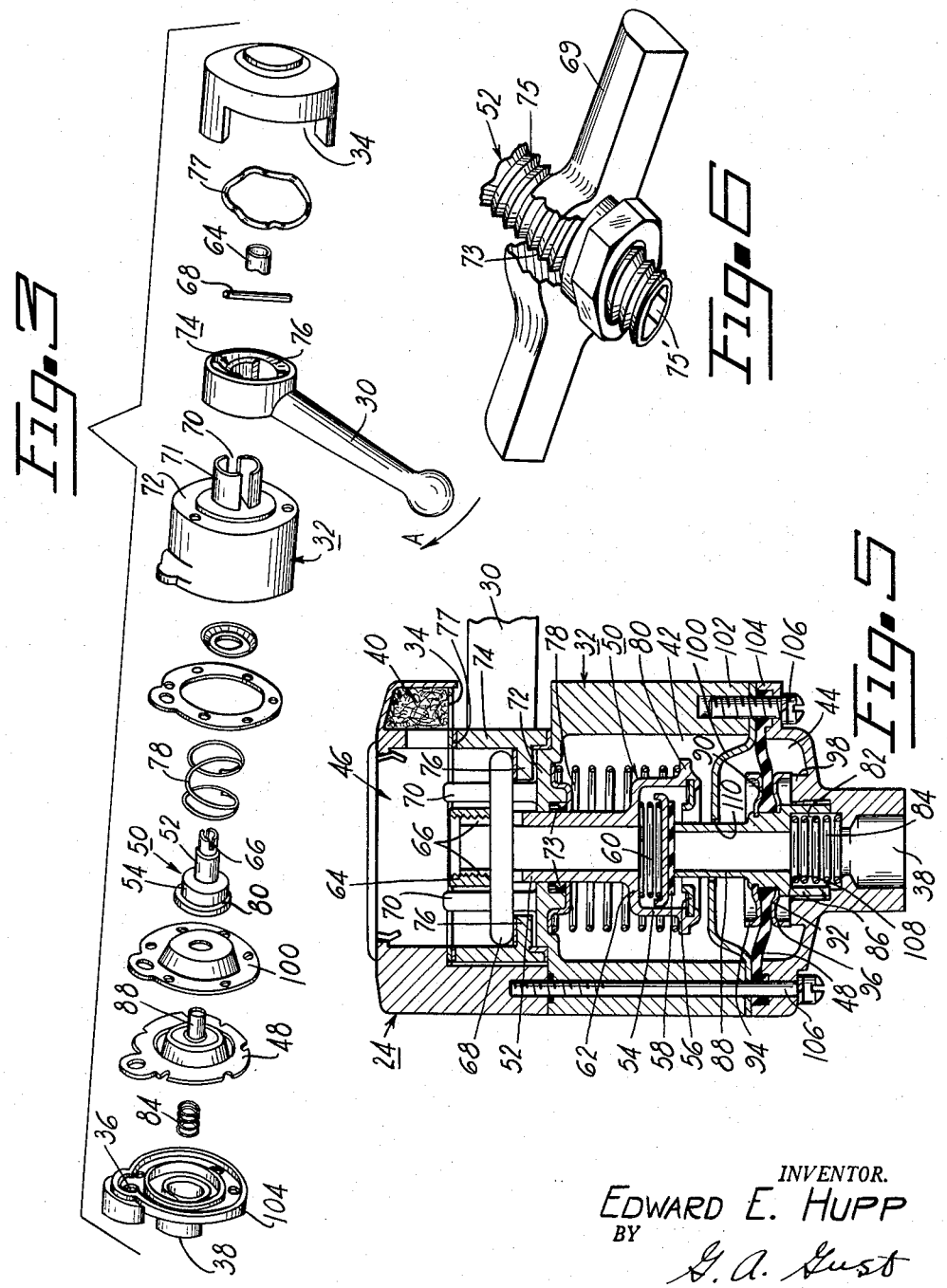

Patented Nov. 3, 1953

2,657,701

UNITED STATES PATENT OFFICE 2,657,701

FLUID CONTROL VALVE

Edward E. Hupp, South Bend, Ind., assignor to Bendix Aviation Corporation, South Bend, Ind., a corporation of Delaware Application May 21, 1949, Serial No. 94,697

17 Claims. (Cl. 137—102)

The present invention relates to fluid control mechanisms for controlling servo-motors operated by a differential of fluid pressures, and particularly to valves for the control of vacuum or air brake systems for automotive vehicles.

The primary object of the present invention is to provide a hand control valve which is economical to manufacture, efficient in operation, and simple in construction.

A further object is to provide a hand control valve which has a minimum of adjustment controls and possesses the desired degree of sensitivity and reliability of control.

A still further object is to furnish a reliable hand control valve having fewer parts than any similar valve heretofore known.

A still further object is to reduce the tendency of a control valve to "horn," a phenomenon encountered in fluid control valves, which is observed as sustained valve cycling.

Other objects of the invention and desirable details of construction of parts will become apparent from the following detailed description of an illustrative embodiment of the invention, taken in conjunction with the accompanying drawings illustrating said embodiment, in which:

Figure 1 is a schematic illustration of a tractor-trailer vehicle combination in which is utilized, as a part of the braking system, an embodiment of the present invention;

Figure 2 shows an axial section of said embodiment in its released or off position;

Figure 3 is an exploded view thereof;

Figure 4 is similar to Figure 2 but with the valve parts shown in their relative positions immediately after an incremental movement of the hand lever in brake applying direction and before the valve parts have lapped;

Figure 5 is a similar view showing the relative positions of the valve parts for fully opened condition; and Figure 6 is an illustration, partly sectioned, of another form of valve adjustment and actuating mechanism.

The drawings and the following description are directed to an embodiment of the present invention which is intended for use on a combination tractor-trailer vehicle to control the trailer brakes. The illustrated system utilizes vacuum suspended trailer brake motors; however, it is to be understood that the control valve of the present invention may be used to actuate other types and designs of fluid motors.

Referring to the drawings and more particularly to Figure 1 thereof, a tractor 10 and a trailer 12 have, respectively, wheel brakes 14 and 16, brakes 16 being connected by means of fluid connections to the power cylinder 18 which is adapted, upon actuation, to apply the said trailer brakes.

The manifold 20 of the tractor engine is utilized as a vacuum source and is connected to a vacuum tank 22 and the power cylinder 18 by means of a conduit 23. The hand control valve 24 of the present invention is connected to conduit 23 at a point near the manifold 20 and is operatively connected to power cylinder 18 by means of control line 26. Interposed in conduit 26 between valve 24 and power cylinder 18 and connected with the vacuum line 23 is a valve device 28 which acts to accelerate response to the trailer power cylinder to actuation of the control valve 24. For purposes of description, the device 28 will be considered merely a part of the control line 26.

The operator of the tractor 10 is intended to manipulate the control valve 24 by moving the handle 30 thereof to regulate the amount of braking torque deliverable to the trailer 12.

The control valve 24 is provided with a casing 32 having three ports 34, 36 (see Figure 3), and 38. Port 36 is connected to control line 26; port 38 communicates with vacuum line 23; and port 34 is at all times open to the atmosphere, the air entering the valve 24 around handle 30 to pass through air cleaner 40.

The valve 24 may conveniently be considered as being divided into three chambers; a control chamber 42, a vacuum or fluid chamber 44, and an air chamber 46. Ports 34, 36, and 38 are connected with chambers 46, 42, and 44, respectively. The control chamber 42 is separated from vacuum chamber 44 by a fluid responsive element or diaphragm 48, preferably fabricated of rubber, which is suitably fastened to the casing 32. The control and vacuum chambers are operatively sealed from the air chamber 46 by means of the air tube assembly or device generally indicated by reference numeral 50. Specifically, this assembly 50 is composed of a cylindrical air tube or first pressure conducting member 52 having a flared end 54 to which is secured an inwardly projecting annular flanged valve seat 56. A valve member or poppet 58 is carried inside flared end 54, and is urged into sealing engagement with valve seat 56 by means of a resilient member such as the cylindrical shaped spring 60 which is compressed between the flared portion 62 of tube 52 and valve member 58.

Air tube 52 is provided at its other end with an open adjusting cap or nut 64 and diametric openings or slots 66 which may be varied in size by turning cap 64 for a purpose to be explained hereinafter. It is obvious that any element which can be adjustably moved to vary the size of said openings 66 may be used in place of the specific arrangement of the cap 64. Into openings 66 is inserted a cam follower or pin 68 which is guided for translatory axial movement with respect to the casing 32 in the slot 70 formed in sleeve 71 (see Figure 3). This sleeve 71 which surrounds the upper end of tube 52 is preferably fixed in position with respect to casing 32 by being formed integral with the control chamber end wall 72 which surrounds air tube 52 in fluid tight relation by means of a rubber sealing ring 73. Rotatably mounted on casing 32 is a cylindrically shaped cam member 74 having two oppositely disposed complementary cam surfaces 76 which are engaged by the ends of cam follower pin 68. The air tube assembly 50 is at all times urged downwardly by means of a cylindrical compression spring 78 which encircles the lower end of air tube 52 to bear against end wall 72 and radial flange 80 on flared end 54 of the air tube 52. Thus, the upper edges of openings 66 are maintained in engagement with cam follower pin 68 to urge it against the cam surfaces 76. By turning the threaded cap or nut 64, the air tube assembly can be raised or lowered with respect to the mouth of tube 88, this constituting the only adjustment necessary for satisfactory operation of the control valve 24. In assembling this valve, this cap 64 is adjusted to compensate for manufacturing tolerances; thus the necessity for precision machining of parts is eliminated. This feature obviously contributes to the economy of construction and lends itself to simplicity of valve design.

In Figure 6 is illustrated a structure which may be substituted for the follower pin 68 and nut 64 assembly. It consists of a yoke or cam follower 69 having a centrally disposed threaded opening 73 which receives the threaded end 75 of air tube 52. Preferably, to facilitate fabrication, air tube 52 is made of polygonal shaped hollow stock thereby leaving a suitably shaped internal opening 75' therein to receive an adjusting tool such as the conventional allen wrench. By inserting an adjusting tool in the opening 75', air tube 52 may be rotated to adjust it vertically in yoke 69.

The waved friction spring 77 on the upper annular surface of cam member 74 used in conjunction with the shallow inclination of the cam surfaces 76 prevent the load of spring 78 from turning handle 30 and to require some manual pressure on the handle 30 in an applying direction before the valve 24 may be actuated.

By turning the handle 30 in a clockwise direction, as indicated by arrow A in Figure 3, the air tube assembly 50 will be forced downwardly under the load of spring 80 and the trailer brakes 16 will be actuated. Counterclockwise movement of the handle will obviously cause this assembly 50 to be raised and the trailer brakes to be released.

The lower end of casing 32 is formed with a cylindrically shaped recess 82 which connects with vacuum port 38 and which houses a compression spring 84 and the enlarged lower end 86 of cylindrical vacuum tube or second fluid pressure conducting member 88, this latter tube 88 being biased upwardly by spring 84 and having its axis coincident with the axes of casing 32 and air tube 52. Diaphragm 48 is sealed to tube 88 intermediate its ends by means of two disk shaped stop and reaction members 90 and 92 which are secured to said vacuum tube by any suitable means and which clamp said diaphragm therebetween. The outer peripheries of these stop members 90 and 92 are formed to provide oppositely extending axial flanges 94 and 96, respectively. Flange 96 is adapted to engage the raised end 98 of casing 32 upon full actuation movement of handle 30, and in released position of handle 30, flange 94 is adapted to engage the transverse, rigid annular shaped member 100 which is preferably secured in fluid tight relation to casing 32. Preferably, the outer peripheral margins of the member 100 and diaphragm 48 are clamped between the sections 102 and 104 of casing 32 which are held together by means of a plurality of screws 106.

As can be seen in the drawings, slight peripheral clearances are provided between the lower end of vacuum tube 88 and the bore 82, and the upper end of this tube and annular member 100, these clearances being indicated by reference numerals 108 and 110, respectively. The purpose of these clearances is to provide for restricted fluid communication, the clearance 108 connecting chamber 44 with port 38, and clearance 110 connecting control chamber 42 with the upper side of diaphragm 48. This restricted fluid communication resists the tendency of the present invention to "horn," a phenomenon characterized by the sound of sustained cycling of a pneumatic valve seeking its lapped position.

The parts of the hand control valve 24 just described are so proportioned that when the valve 24 is in released position, the valve member 58 rests on annular valve seat 56, while the upper end of vacuum tube 88 is slightly spaced from the valve member 58. In this position, air at atmospheric pressure is confined to the interior of air tube 52. Vacuum connected with port 38 is communicated to the upper side of diaphragm 48 by means of the vacuum tube 88 and through its clearance with valve member 58 and passage 110. Thus in released position, diaphragm 48 is submerged or suspended in vacuum or the pressure to which port 38 might be connected.

For fully applying the trailer brakes, the hand control valve operates as follows (see Figure 5). The handle 30 is moved to its extreme clockwise position. Air tube 52 is then moved downwardly under the influence of spring 78 to a point corresponding to the lowest point on cam surfaces 76. Poppet 58 engages the upper end of vacuum tube 88, and air thereupon flows through port 34, around said poppet, into control chamber 42, and through clearance 110 to the upper side of diaphragm 48 and also out of port 36 to control line 26. The differential of pressure thus created over diaphragm 48 forces the vacuum tube 88 downwardly until flange 96 engages the raised end wall 98. In this fully applied position, air at atmospheric pressure is virtually dumped into the control chamber 42, and passes through port 36 into line 26 and poppet 58 is withheld from its seat 56 by the upper end of vacuum tube 88. The brake motor 18, which is vacuum suspended in released condition, is thereupon actuated by the introduction of this atmospheric pressure. Vacuum is cut off from the control chamber 42, and air is prevented from entering the vacuum tube 88 by the poppet 58.

In the operation of the hand control valve for other than full application of the trailer brakes, the handle 30 is moved in a clockwise direction a distance corresponding to the amount of brake application desired. As explained above, air tube 52 is moved downwardly a distance corresponding to the elevation of the contact points of pin 68 on cam surfaces 76. Poppet 58 is unseated from seat 56 by the upper end of vacuum tube 88 and, as before, air at atmospheric pressure flows into the control chamber 42 from chamber 46, out of port 36, and through line 26 to motor 18. In the preferred design, a pressure differential of four pounds per square inch over diaphragm 48 will overcome the load of spring 84 to start to move vacuum tube 88 downwardly, spring 84 being designed with respect to the area of diaphragm 48 to allow for the full application of the trailer brakes by incremental movements of handle 30. Vacuum tube 88 is carried downwardly by the differential pressure over diaphragm 48 against the load of spring 84 until poppet 58 just comes into sealing engagement with its seat 56 thereby sealing off the flow of air from the air tube 52 into control chamber 42 to prevent any further change in differential pressure over and downward movement of diaphragm 48. At this point the valve parts are in lapped position, with poppet 58 engaging in sealing relation both the valve seat 56 and the upper end of vacuum tube 88. Further clockwise movement of handle 30 for more braking power will result in relative movement of the valve parts with the vacuum tube always following up to this lapped position. Explaining this incremental braking in a slightly different manner, it is obvious, referring to Figure 2, that in "off" position, chambers 42 and 44 are in direct vacuum communication via the tube 88 and vacuum port 38, so that when the upper end of tube 88 is sealed off (see Figure 4) by an incremental movement of handle 30 to sever this communication and uncover valve seat 56, air at atmospheric pressure will flow through port 34, chamber 46, air tube 52, into chamber 42 from which it passes through port 36, line 26 to brake motor 18. Also, this air flowing into chamber 42 acts on diaphragm 48 to create a differential pressure thereover which forces this diaphragm downwardly against the load of spring 84. As the diaphragm 48 moves downwardly, poppet 58 eventually engages and closes the opening of valve 56 thereby preventing further communication of atmospheric pressure to chamber 42. The diaphragm 48 thereby ceases its downward travel, because the pressure on the top side thereof becomes static, at a value less than atmospheric, which is balanced by spring 84. Poppet 58 now seals both the opening of valve 56 and the upper end of tube 88 and is characterized as being in lapped position. As explained above, further incremental movements of handle 30 will effect corresponding incremental increases in pressure in chamber 42 and motor 18 until the handle movement is sufficient to allow full communication of atmospheric pressure to chamber 42 and brake motor 18.

In release of the brakes, the handle is moved to its extreme counterclockwise position to lift air tube assembly 50 and to permit vacuum tube 88 to return to operative abutting engagement with member 100 as illustrated in Figure 2. When this occurs, vacuum is restored to the control chamber 42 around the open upper end of vacuum tube 88, and the flow of air to the control chamber is sealed off by poppet 58 resting on its seat 56.

In addition to the advantages outlined in the preceding description, the preferred embodiment of the present invention constitutes a design which lends itself to facile assembly since the number of valve parts have been held to a minimum and valve adjustment is accomplished by movement of only one valve part, the threaded cap or nut 64.

Although only one embodiment of the invention has been illustrated and described, various changes in the form and relative arrangements of the parts may be made to suit requirements.

I claim:

1. A fluid control valve comprising a casing, a flexible diaphragm secured in said casing to define a control chamber and a vacuum chamber, a vacuum tube carried intermediate its ends by said diaphragm, one end of said tube opening into said control chamber and the other end opening into said vacuum chamber, resilient means acting on said vacuum tube to urge it towards said control chamber, a transverse rigid member separating the control chamber from one side of said diaphragm and having an opening for said vacuum tube large enough to provide a clearance for fluid communication from said control chamber to said one side of said diaphragm, a recess formed in the bottom of said casing surrounding said other end of said vacuum tube to provide for a slight clearance therebetween for the communication of fluid from said other end of said vacuum tube to the adjacent side of said diaphragm, an air tube projecting into said control chamber having a flared end and a valve seat formed therein, a valve member carried in said flared end and spaced from said one end of said vacuum tube and biased to seat on said valve seat to prevent fluid communication between the interior of said air tube and said control chamber, said air tube being axially movable to cause said valve member to close said one end of said vacuum tube and to be lifted from said valve seat thereby permitting fluid communication between said control chamber and the interior of said air tube, resilient means urging said air tube towards actuating position, the end of said air tube remote from said control chamber being provided with a pair of adjustable diametric openings, a cam follower projecting through said openings, a sleeve secured to said casing surrounding the end of said air tube having the openings, axial guide slots formed in said sleeve engaged by said cam follower, an annular shaped cam member surrounding said sleeve also engaged by said cam follower, and an operating handle extending from said cam member.

2. A fluid control valve comprising a casing, a flexible diaphragm dividing said casing into a control chamber and a vacuum chamber, a vacuum tube carried intermediate its ends by said diaphragm, one end of said tube opening into said control chamber and the other end opening into said vacuum chamber, resilient means acting on said vacuum tube to urge it towards said control chamber, fluid restricting means between the control chamber side of said diaphragm and said control chamber, an air tube projecting into said control chamber and carrying a valve member operable to prevent communication between said control chamber and the interior of said air tube, said valve member being positioned over the corresponding end of said vacuum tube for closing same upon movement of said air tube in one direction, a yoke member threadedly received on the end of said air tube remote from said control chamber, guide means provided on said casing to permit only translatory movement of said yoke member, and a cam member engaging said yoke member for effecting the aforesaid translatory movement.

3. A fluid control valve comprising a casing, a flexible diaphragm secured in said casing to define a control chamber and a vacuum chamber, a vacuum tube carried intermediate its ends by said diaphragm, one end of said tube opening into said control chamber and the other end opening into said vacuum chamber, resilient means acting on said vacuum tube to urge it towards said control chamber, a transverse rigid member separating the control chamber from one side of said diaphragm and having an opening for said vacuum tube large enough to provide a clearance for fluid communication from said control chamber to said one side of said diaphragm, a recess formed in the bottom of said casing surrounding the other end of said vacuum tube to provide for a slight clearance therebetween for the communication of fluid from said other end of said vacuum tube to the adjacent side of said diaphragm, an air tube projecting into said control chamber having a flared end and a valve seat formed thereon, a valve member carried in said flared end and spaced from said one end of said vacuum tube and biased to seat on said valve seat to prevent fluid communication between the interior of said air tube and said control chamber, said air tube being axially movable to cause said valve member to close said one end of said vacuum tube and to be lifted from said valve seat, thereby permitting fluid communication between said control chamber and the interior of said air tube, resilient means urging said air tube towards actuating position, the end of said air tube remote from said control chamber being provided with a pair of adjustable diametric openings, a cam follower projecting through said openings, a sleeve secured to said casing surrounding the end of said air tube having the openings, an axial guide slot formed in said sleeve and engaged by said cam follower, an annular cam member surrounding said sleeve also engaged by said cam follower, and an operating handle extending from said cam member.

4. A fluid control valve comprising a casing, a flexible diaphragm dividing said casing into a control chamber and a vacuum chamber, a vacuum tube carried intermediate its ends by said diaphragm, one end of said tube opening into said control chamber and the other end opening into said vacuum chamber, resilient means acting on said vacuum tube to urge it towards said control chamber, fluid restricting means between the control chamber side of said diaphragm and the control chamber, an air tube projecting into said control chamber and carrying a valve member operable to prevent communication between said control chamber and the interior of said air tube, said valve member being positioned over the corresponding end of said vacuum tube for closing same upon movement of said air tube in one direction, the end of said air tube remote from said control chamber being provided with a pair of adjustable diametric openings, a cam follower projecting through said openings, guide means provided on said casing to restrict movement of said cam follower to a plane including the axis of said casing, and a cam member engaging said cam follower for effecting the aforesaid axial movement of said cam follower.

5. A fluid control valve comprising a casing, a flexible diaphragm dividing said casing into a control chamber and a vacuum chamber, a vacuum tube carried intermediate its ends by said diaphragm, one end of said tube opening into said control chamber and the other end opening into said vacuum chamber, resilient means acting on said vacuum tube to urge it towards said control chamber, fluid restricting means between the control chamber side of said diaphragm and said control chamber, an air tube projecting into said control chamber and carrying a valve member operable to control communication between said control chamber and the interior of said air tube, said valve member being positioned over the corresponding end of said vacuum tube to close same upon movement of said air tube in one direction, a cam follower adjustably received on the end of said air tube remote from said control chamber, guide means provided on said casing to restrict movement of said cam follower to a single plane, and a cam member engaging said cam follower for effecting the aforesaid single plane movement.

6. In a control valve having a control chamber and a vacuum chamber, a flexible diaphragm separating said chambers from each other, a vacuum tube carried by said diaphragm and having one end disposed in said control chamber and the other end disposed in said vacuum chamber, a controllable air tube device operatively associated with said vacuum tube and arranged to control communication between said chambers, such communication being afforded by means of said vacuum tube, said air tube device including valve means which controls communication of vacuum and of air at atmospheric pressure to said control chamber, and means for controlling said device.

7. A valve for controlling fluid pressure comprising a casing, a fluid pressure responsive member dividing said casing into a control chamber and a vacuum chamber, a vacuum tube carried by said fluid pressure responsive member and having one end disposed in said vacuum chamber and the other end disposed in said control chamber, said vacuum tube being adapted to provide communication between said chambers, means yieldably urging said vacuum tube and said fluid pressure responsive member toward said control chamber, an air tube reciprocably projecting into said control chamber, a valve member carried by said air tube and arranged to control communication between the interior of said air tube and said control chamber, said valve member also being arranged to control the communication between the interior of said vacuum tube and said control chamber, means yieldably urging said air tube in a direction tending to cause said valve member to sever communication between the interior of the vacuum tube and the control chamber, and means for selectively positioning said air tube.

8. A valve for controlling fluid pressure comprising a casing, a fluid pressure responsive member dividing said casing into a control chamber and a vacuum chamber, a vacuum tube carried by said fluid pressure responsive member and having one end disposed in said vacuum chamber and the other end disposed in said control chamber, said vacuum tube being adapted to provide communication between said chambers, means yieldably urging said vacuum tube and said fluid pressure responsive member toward said control chamber, a movable air tube projecting into said control chamber, means for selectively moving said air tube, and a valve member carried by said air tube and arranged to control communication between the interior of said air tube and said control chamber, said valve member also being arranged to control the communication between the interior of said vacuum tube and said control chamber.

9. A valve for controlling fluid pressure comprising a casing, a fluid pressure responsive member dividing said casing into a control chamber and a vacuum chamber, a vacuum tube carried by said fluid pressure responsive member and having one end disposed in said vacuum chamber and the other end disposed in said control chamber, said vacuum tube being adapted to provide communication between said chambers, an air tube reciprocably projecting into said control chamber, a valve member carried by said air tube and arranged to control communication between said air tube and said control chamber, said valve member also being arranged to control the communication between said vacuum tube and said control chamber, and means yieldably urging said air tube in a direction which tends to move said valve member to sever the communication between the vacuum tube and control chamber, and means for selectively positioning said air tube.

10. A valve for controlling fluid pressure and having a control chamber and a low pressure chamber, a fluid pressure responsive member separating said chambers, first fluid pressure-conducting means carried by said fluid pressure responsive member and being adapted to provide communication between said chambers, means yieldably urging said fluid pressure responsive member toward said control chamber, a second fluid pressure-conducting means projecting into said control chamber and being adapted to communicate a fluid pressure to said control chamber, a valve member carried by said second fluid pressure-conducting means and arranged to control communication between said control chamber and said second fluid pressure-conducting means, said valve member also being arranged to cooperate with said first fluid pressure-conducting means to control the communication between said chambers, means yieldably urging said second fluid pressure-conducting means in a direction which tends to move said valve member in a direction to sever the communication between said chambers, and means for selectively adjusting said first fluid pressure-conducting means.

11. A valve for controlling fluid pressure and having a control chamber and a low pressure chamber, a fluid pressure responsive member separating said chambers, first fluid pressure-conducting means carried by said fluid pressure responsive member and being adapted to provide communication between said chambers, means yieldably urging said fluid pressure responsive member toward said control chamber, a second fluid pressure-conducting means adapted to communicate a fluid pressure to said control chamber, a valve member carried by said second fluid pressure-conducting means and arranged to control communication between said control chamber and said second fluid pressure-conducting means, said valve member also being arranged to cooperate with said first fluid pressure-conducting means to control the communication between said chambers, and means for controlling one of said fluid pressure-conducting means.

12. A fluid control valve comprising a casing, a flexible diaphragm secured in said casing, a vacuum tube carried by said diaphragm intermediate its ends, the opposite ends of said tube being in communication with the respective sides of said diaphragm, a manipulable air tube projecting through one end of said casing in sealed relation therewith and being cooperatively positioned with respect to said vacuum tube, a yieldable valve member carried by said air tube for effecting closure of one end of said vacuum tube, means for manipulating said air tube, and resilient means acting on said vacuum tube to resist movement of said vaccum tube by said valve member.

13. In a control valve having a control chamber and a vacuum chamber, a flexible diaphragm which separates the two chambers, a vacuum tube carried by said diaphragm to provide communication between said chambers, a controllable air tube device operatively associated with said vacuum tube and having a valve member arranged to cut off communication between said vacuum tube and said control chamber and to momentarily open said control chamber to air at atmospheric pressure, and means for controlling said device.

14. In a control valve having a control chamber and a vacuum chamber, a movable wall which separates the two chambers, a vacuum tube carried by said wall to provide communication between said chambers, a controllable air tube device operatively associated with said vacuum tube and having a valve member arranged to cut off communication between said vacuum tube and said control chamber and to open said control chamber to air at atmospheric pressure, and means for controlling said device.

15. In a control valve having a control chamber and a vacuum chamber, a vacuum-conducting member carried by a fluid pressure responsive element which separates the two chambers, said vacuum-conducting member providing communication between said chambers, an air-conducting device cooperatively associated with said vacuum-conducting member and having a valve member arranged to cut off communication between said vacuum-conducting member and said control chamber and to permit the entrance of air into said control chamber, and means for controlling said device.

16. In a control valve having first and second chambers, a fluid pressure-conducting member carried by a yieldable fluid pressure responsive element which separates the two chambers, said member providing communication between said chambers for one operating position of the control valve, a fluid pressure-conducting device cooperable with said member and having a valve member arranged to sever communication between said chambers and to permit the flow of pressure fluid into said first chamber, and means for controlling said valve member.

17. A valve for controlling communication of fluid pressure to a fluid-pressure-responsive device, comprising: a valve casing having a pressure-responsive member therein forming a movable partition between a high pressure chamber and a low pressure chamber, a first fluid-pressure-conducting means arranged to move in response to movement of said member to a first position and provide communication between said chambers, a second fluid-pressure-conducting means adapted to communicate a fluid pressure to one of said chambers to effect movement of said member to a second position, means for selectively adjusting said second fluid-pressure-conducting means, and a valve member responsive to such adjustment and arranged to control communication between said one of said chambers and said second fluid-pressure-conducting means, said valve member also coacting with said first fluid-pressure-conducting means to control communication between said chambers and effect movement of said member to said second position.

EDWARD E. HUPP.

References Cited in the file of this patent

FOREIGN PATENTS

| Number | Country | Date |
|--------|---------|------|
| 67,598 | Norway | of 1941 |
| 107,058 | Great Britain | of 1917 |